US012668056B2

(12) United States Patent
Hatano

(10) Patent No.: US 12,668,056 B2
(45) Date of Patent: Jun. 30, 2026

(54) LIQUID DISCHARGE HEAD SUBSTRATE, LIQUID DISCHARGE HEAD, AND LIQUID DISCHARGE APPARATUS

(71) Applicant: CANON KABUSHIKI KAISHA, Tokyo (JP)

(72) Inventor: Yuuichirou Hatano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 18/601,099

(22) Filed: Mar. 11, 2024

(65) Prior Publication Data

US 2024/0308213 A1 Sep. 19, 2024

(30) Foreign Application Priority Data

Mar. 16, 2023 (JP) ................................ 2023-042316

(51) Int. Cl.
*B41J 2/045* (2006.01)
*B41J 2/14* (2006.01)

(52) U.S. Cl.
CPC ....... *B41J 2/04563* (2013.01); *B41J 2/14072* (2013.01); *B41J 2/14129* (2013.01); *B41J 2/14153* (2013.01); *B41J 2002/14491* (2013.01)

(58) Field of Classification Search
CPC ................ B41J 2/14153; B41J 2/04563; B41J 2/14072; B41J 2/14129; B41J 2002/14491
See application file for complete search history.

(56) References Cited

U.S. PATENT DOCUMENTS

2020/0338888 A1* 10/2020 Sakuma ............... B41J 2/14129
2021/0370670 A1 12/2021 Nomura et al.

FOREIGN PATENT DOCUMENTS

JP 2021-187064 A 12/2021

* cited by examiner

*Primary Examiner* — Geoffrey S Mruk
(74) *Attorney, Agent, or Firm* — VENABLE LLP

(57) ABSTRACT

A liquid discharge head substrate including a substrate, electrothermal convertors arranged on a surface of the substrate along a first direction, temperature detectors arranged along the first direction, liquid supply ports arranged along the first direction and a structure including wiring layer in an insulator arranged between the surface and the temperature detectors is provided. A wiring pattern arranged in the wiring layer which is nearest to the temperature detectors is provided with opening portions arranged along the first direction so as to be adjacent to the temperature detectors. The opening portions include first openings and second openings, each of the liquid supply ports passes through a corresponding one of the first openings, and the second openings are embedded with part of the insulator and are arranged at least two ends of an array of the opening portions.

18 Claims, 11 Drawing Sheets

LIQUID DISCHARGE HEAD SUBSTRATE, LIQUID DISCHARGE HEAD, AND LIQUID DISCHARGE APPARATUS

BACKGROUND OF THE INVENTION

Field of the Invention

The present invention relates to a liquid discharge head substrate, a liquid discharge head, and a liquid discharge apparatus.

Description of the Related Art

Liquid discharge apparatuses using liquid discharge head substrates include a thermal type apparatus that discharges a liquid by using the thermal energy generated by an electrothermal converting element (heater). Japanese Patent Laid-Open No. 2021-187064 discloses a technique of arranging a temperature sensor for detecting a temperature near a heater to indicate a liquid discharge state based on the detection of a change in the temperature of the heater.

SUMMARY OF THE INVENTION

An interlayer dielectric layer including a wiring pattern can be arranged between a substrate and a detection element for detecting the temperature of the heater. Interlayer dielectric layers are formed by using a plasma chemical vapor deposition method and the like. Some of them contain hydrogen. At the time of manufacturing a liquid discharge head substrate, hydrogen in an interlayer dielectric layer is discharged in a process such as annealing and can be adsorbed to the detection element. Characteristics such as the resistance value of the temperature detection element arranged near the temperature sensor can change due to the adsorption of hydrogen. As the adsorption amount of hydrogen varies depending on the temperature detection element, the characteristics of the temperature sensor vary. This may lead to a deterioration in the accuracy of detection of temperatures.

Some embodiments of the present invention provide a technique advantageous in measuring the temperature of a liquid discharge head substrate.

According to some embodiments, a liquid discharge head substrate comprising a substrate, a plurality of electrothermal converting elements arranged on a principal surface of the substrate along a first direction to discharge a liquid, a plurality of temperature detection elements arranged along the first direction to detect temperatures of the plurality of electrothermal converting elements, a plurality of liquid supply ports arranged along the first direction to supply the liquid, and a structure including at least one wiring layer in an insulating film arranged between the principal surface and the plurality of temperature detection elements, wherein a wiring pattern arranged in a first wiring layer, of the wiring layers, which is nearest to the plurality of temperature detection elements is provided with a plurality of opening portions arranged along the first direction so as to be adjacent to the plurality of temperature detection elements in an orthogonal projection with respect to the principal surface, the plurality of opening portions include a plurality of first opening portions and a plurality of second opening portions, each of the plurality of liquid supply ports passes through a corresponding one of the plurality of first opening portions, and the plurality of second opening portions are embedded with part of the insulating film and are arranged at least two ends of an array of the plurality of opening portions, is provided.

Further features of the present invention will become apparent from the following description of exemplary embodiments (with reference to the attached drawings).

DESCRIPTION OF THE EMBODIMENTS

Figure 1:
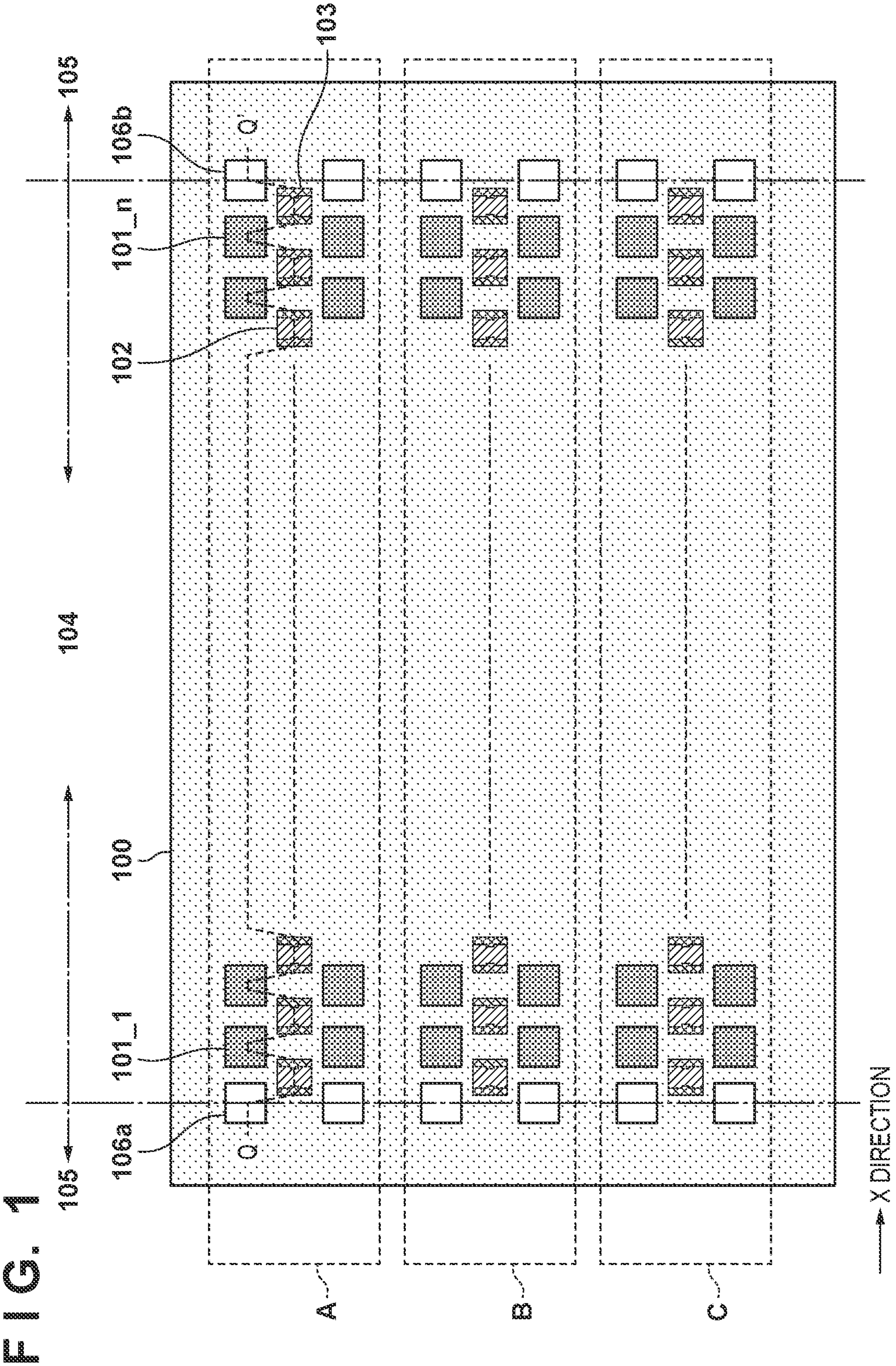
FIG. 1 is a plan view showing an example of the arrangement of a liquid discharge head substrate according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 2:
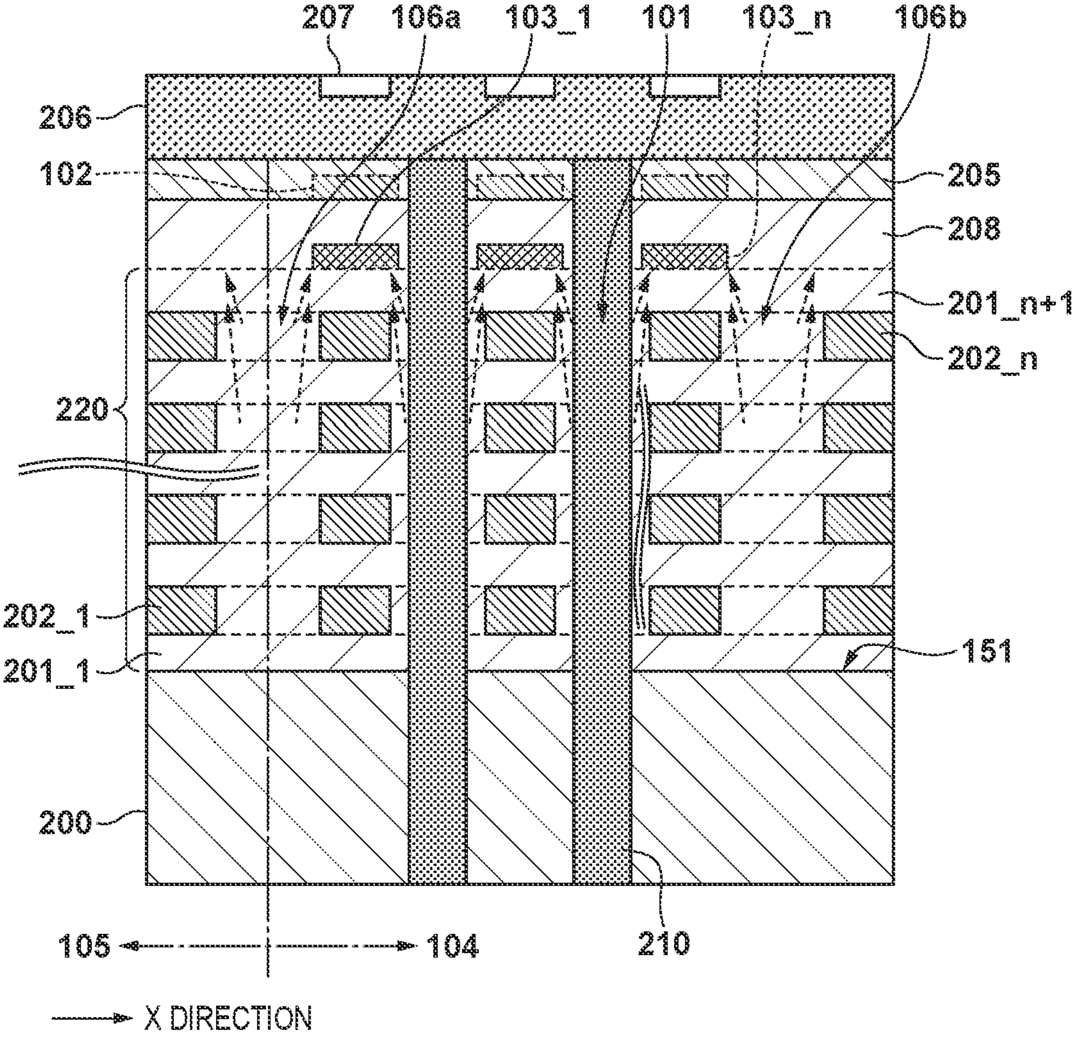
FIG. 2 is a sectional view showing an example of the arrangement of the liquid discharge head substrate in FIG. 1.

A liquid discharge head substrate according to an embodiment of this disclosure will be described with reference to FIGS. 1 to 9. FIG. 1 is a plan view showing an example of the arrangement of a liquid discharge head substrate 100 according to this embodiment. FIG. 2 shows an example of the arrangement of a section along Q-Q' in FIG. 1.

The liquid discharge head substrate 100 includes a substrate 200, a plurality of electrothermal converting elements 102 arranged on a principal surface 151 of the substrate 200 along the X direction to discharge a liquid, and a plurality of temperature detection elements 103 arranged along the X direction to detect the temperatures of the plurality of electrothermal converting element 102. As shown in FIGS. 1 and 2, the electrothermal converting elements 102 and the temperature detection elements 103 may be arranged in one-to-one correspondence. In addition, the liquid discharge head substrate 100 includes a plurality of liquid supply ports 210 (shown in FIG. 2) arranged along the X direction to supply the liquid to the plurality of electrothermal converting elements 102. The liquid supply ports 210 are arranged in opening portions 101 (to be described later). A structure 220 including at least one wiring layer 202 is arranged in an insulating film 201 arranged between the principal surface 151 of the substrate 200 and the plurality of temperature detection elements 103. In this embodiment, the structure 220 is provided with the plurality of wiring layers 202.

As shown in FIG. 1, the electrothermal converting elements 102, the temperature detection elements 103, and the liquid supply ports 210 (the opening portions 101) may be sorted in regions A to C by the colors of liquids such as inks. The shapes of the electrothermal converting element 102 and the temperature detection element 103 are not limited to those shown in FIGS. 1 and 2 and may be appropriate shapes, respectively. Regions A to C shown in FIG. 1 are respectively associated with the different colors. The number of colors is not limited to three and may be two or less or four or more.

A liquid discharge region 104 shown in FIGS. 1 and 2 is a region provided to discharge a liquid. As shown in FIG. 2, the liquid discharge region 104 can be a region having discharge ports 207 arranged above the electrothermal converting elements 102. The liquid supply ports 210 (the opening portions 101) are arranged in the liquid discharge region 104. The electrothermal converting elements 102 and the temperature detection elements 103 are also arranged in the liquid discharge region 104 in a similar manner. In this embodiment, opening portions 106 (to be described later) are arranged in non-liquid discharge regions 105 as regions that are not provided to discharge a liquid. The non-liquid discharge regions 105 can regarded as regions in which no discharge ports 207 are arranged.

As shown in FIGS. 1 and 2, the wiring pattern arranged in a wiring layer 202_*n*, of the wiring layers 202 arranged on the structure 220, which is nearest to the plurality of temperature detection elements 103 is provided with a plurality of opening portions 101 and 106 along the X direction. The plurality of opening portions 101 and 106 are arranged along the X direction so as to be adjacent to the plurality of temperature detection elements 103 in an orthogonal projection with respect to the principal surface 151 of the substrate 200. The plurality of opening portions 101 and 106 are divided into the plurality of opening portions 101 and the plurality of opening portions 106. The plurality of liquid supply ports 210 respectively pass through the plurality of opening portions 101. On the other hand, the plurality of opening portions 106 are embedded with part of the insulating film 201. The liquid supply ports 210 do not pass through the plurality of opening portions 106. In general, the wiring layer 202_*n*, of the wiring layers 202, which is arranged uppermost is often provided with a thick wiring pattern that supplies a power supply potential or a reference potential. The plurality of opening portions 101 and 106 can be opening portions provided with such thick wiring patterns.

As shown in FIG. 2, in an orthogonal projection with respect to the principal surface 151 of the substrate 200, the wiring layer 202 arranged between the wiring layer 202_*n*, of the plurality of wiring layers 202, which is provided with the opening portions 101 and 106 is not provided with a wiring pattern in a region overlapping with the opening portion 101 to make the liquid supply port 210 pass. In addition, in an orthogonal projection with respect to the principal surface 151 of the substrate 200, the wiring layer 202 arranged between the wiring layer 202_*n*, of the plurality of wiring layers 202, which is provided with the opening portions 101 and 106 and the principal surface 151 of the substrate 200 need not be provided with a wiring pattern in a region overlapping the opening portion 101, as shown in FIG. 2.

In the arrangement shown in FIG. 2, in an orthogonal projection with respect to the principal surface 151 of the substrate 200, the opening portions 101 each have the same area as that of each of the opening portions 106. In addition, the wiring layer 202 arranged between the wiring layer 202_*n* of the plurality of wiring layers 202 and the principal surface 151 of the substrate 200 is provided with an opening portion (a region provided with no wiring pattern) having the same area as that of the opening portion 101 in a region overlapping the opening portion 101. Likewise, the wiring layer 202 arranged between the wiring layer 202_*n* of the plurality of wiring layers 202 and the principal surface 151 of the substrate 200 is provided with an opening portion (a region provided with no wiring pattern) having the same area as that of the opening portion 106 in a region overlapping the opening portion 106. However, this is not exhaustive. If the liquid supply port 210 can pass through a region overlapping the opening portion 101 of the wiring layer 202 arranged between the wiring layer 202_*n* and the principal surface 151 of the substrate 200, an opening portion having an area different from that of the opening portion 101 may be provided. A region overlapping the opening portion 106 of the wiring layer 202 arranged between the wiring layer 202_*n* and the principal surface 151 of the substrate 200 will be described later. In this case, "each" of the opening portions 101 described above need not indicate "all" of the plurality of opening portions 101. The same applies to other arrangements and the like.

As shown in FIG. 2, the structure 220 between the substrate 200 and the temperature detection elements 103 can have a multilayer structure constituted by the plurality of insulating films 201 and the plurality of wiring layers 202. An insulating film 201_*n*+1 is stacked on the wiring layer 202_*n* as the uppermost wiring layer 202, and the temperature detection element 103 is arranged on the insulating film 201_*n*+1. An insulating film 208 is provided to cover the temperature detection element 103, and the electrothermal converting element 102 is arranged on the insulating film 208. The electrothermal converting element 102 is covered by a protective film 205 (insulating film). A discharge port formation portion 206 for discharging a liquid and the discharge port 207 are arranged on the protective film 205.

Figure 9:
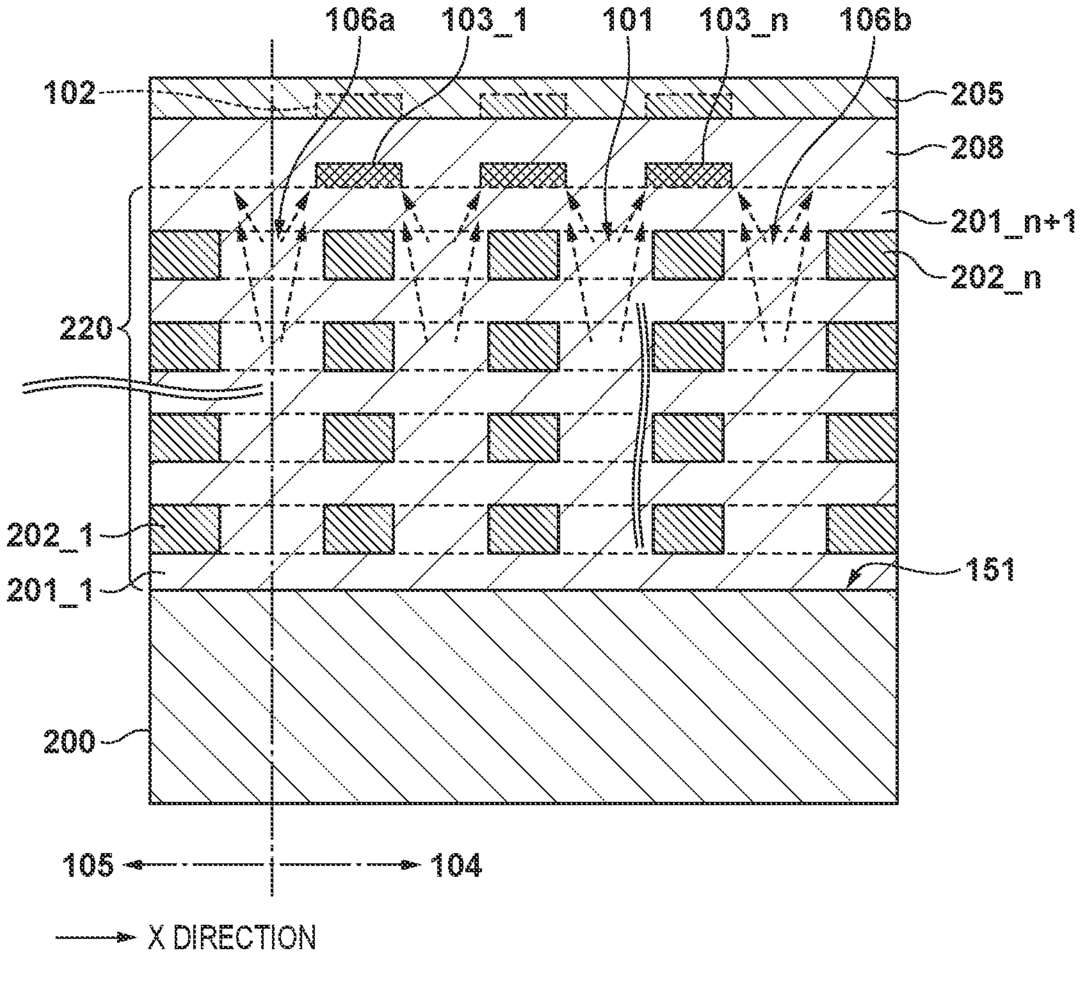
FIG. 9 is a sectional view showing a manufacturing process for the liquid discharge head substrate in FIG. 1.

The liquid stored in the discharge port formation portion 206 is discharged from the discharge port 207 by the heat generated by the electrothermal converting element 102. The temperature detection element 103 detects a temperature change when the liquid is discharged and determines whether the liquid has been normally discharged. Silicon oxide, silicon nitride, or the like is used for the insulating film 201. The insulating film 201 is formed by using a chemical vapor deposition (CVD) method or the like. Accordingly, the insulating film 201 sometimes contains hydrogen. In an annealing process or the like before the formation of the liquid supply port 210 shown in FIG. 9, hydrogen from the insulating film 201 is discharged and diffused. In addition, a material that changes in resistance value upon occluding hydrogen, such as titanium, tantalum, palladium, or magnesium, can be used for the temperature detection element 103. For this reason, in an annealing process or the like, when hydrogen in the insulating film 201 is discharged and diffused, the hydrogen is supplied to the temperature detection element 103. This can change the resistance value of the temperature detection element 103. In this embodiment, as shown in FIG. 9, the opening portions 106 are arranged in the end portions of the liquid discharge region 104 in addition to the opening portions 101 for passing the liquid supply ports 210. Accordingly, as compared with the case where the opening portions 106 are not arranged, hydrogen similar in amount to that in temperature detection elements 103_2 (the second temperature detection element 103 from the left side in FIG. 1) to 103_*n*–1 (the second temperature detection element 103 from the right side in FIG. 1) arranged inside the liquid discharge region 104 is supplied to temperature detection elements 103_1 and 103_*n* arranged on the end portion in the X direction. As a result, the temperature detection elements 103 exhibit similar resistance value changes and hence can accurately detect a temperature change to determine whether a liquid has been normally discharged at the time of discharging the liquid.

The opening portions 106 are arranged at least the two ends of each of arrays of the plurality of opening portions 101 and 106. In some case, the liquid supply ports 210 are not arranged in the end portions of the liquid discharge region 104, and, as a consequence, the opening portions 106 are not provided. In such a case, the temperature detection elements 103 arranged on the end portions of the liquid discharge region 104 may vary in characteristics due to the differences between the amounts of adsorption of hydrogen in the temperature detection elements 103, resulting in a deterioration in the accuracy of temperature detection. In contrast to this, the arrangement of this embodiment can suppress variations in the sensitivity of the detection of troubles at the time of discharging at the end portions of the liquid discharge region 104. The liquid discharge head substrate 100 according to this embodiment can detect temperatures with uniform accuracy (sensitivity) at the respective temperature detection elements 103 and hence need not use any system for correcting temperatures detected on the subsequent stage. This makes it possible to simplify the arrangements of the liquid discharge head and the liquid discharge apparatus including the liquid discharge head substrate 100.

The opening portions 106 need not always be arranged in the two end portions of each of the arrays of the plurality of opening portions 101 and 106 in the X direction in the liquid discharge region 104. Although it depends on the length of the liquid discharge region 104 in the X direction, the number of liquid supply ports 210 and the like, the opening portions 106 may be arranged inside the liquid discharge region 104. For example, in the liquid discharge region 104, one or more opening portions 101 provided with the liquid supply ports 210 and one or more opening portions 106 provided with no liquid supply ports 210 may be alternately arranged. As shown in FIG. 1, the plurality of opening portions 101 and 106 may be arranged at the same pitch as that of the plurality of electrothermal converting elements 102 in the X direction. Likewise, the plurality of opening portions 101 and 106 may be arranged at the same pitch as that of the plurality of temperature detection elements 103 in the X direction. With this arrangement, in the annealing process shown in FIG. 9, the same amount of hydrogen is supplied to each temperature detection element 103.

Figure 3:
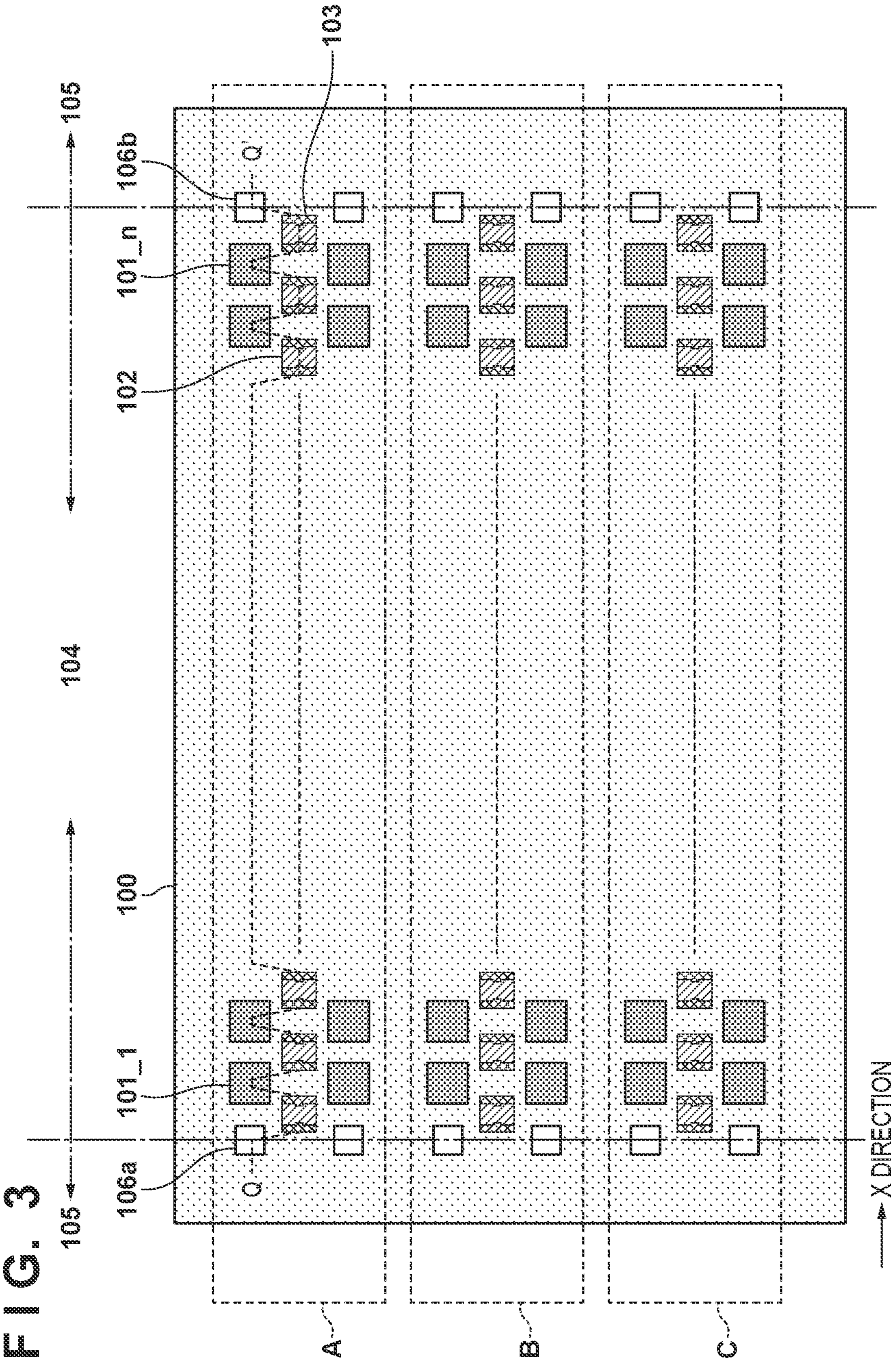
FIG. 3 is a plan view showing a modification of the liquid discharge head substrate in FIG. 1.
Figure 4:
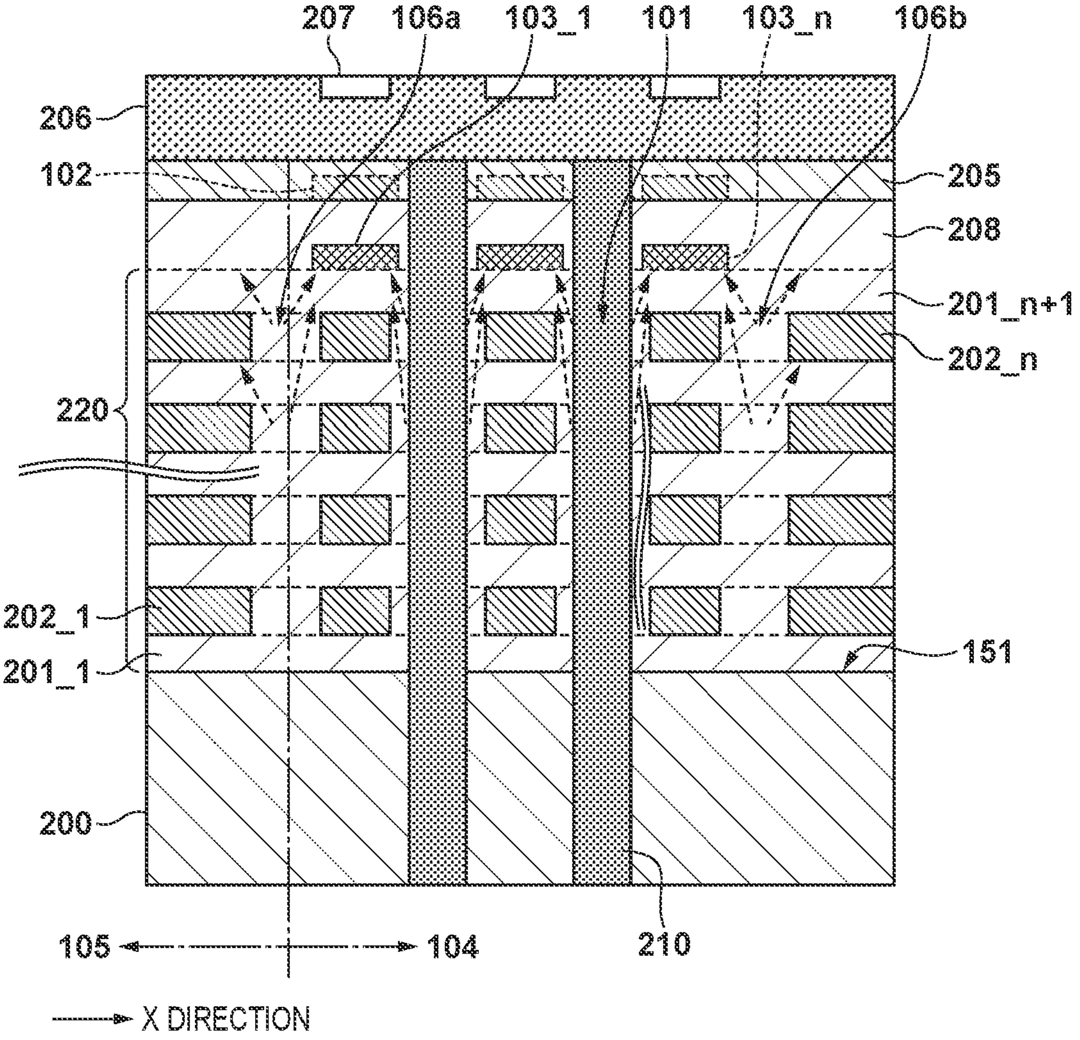
FIG. 4 is a sectional view showing an example of the arrangement of the liquid discharge head substrate in FIG. 3.

FIGS. 3 and 4 show a modification of the liquid discharge head substrate 100 shown in FIGS. 1 and 2. In the arrangement shown in FIGS. 3 and 4, in an orthogonal projection with respect to the principal surface 151 of the substrate 200, the opening portions 101 (opening portions 101_1 to 101_*n*) each have an area different from that of each of the opening portions 106 (opening portions 106*a* and 106*b*). For example, as shown in FIGS. 3 and 4, the plurality of opening portions 101 each may have an area larger than that of each of the plurality of opening portions 106. Other arrangements may be the same as those shown in FIGS. 1 and 2.

In the arrangement shown in FIGS. 3 and 4, the wiring layer arranged between the wiring layer 202_*n* of the wiring layers 202 and the principal surface 151 of the substrate 200 is provided with an opening portion (a region provided with no wiring pattern) having the same area as that of the opening portion 101 in a region overlapping the opening portion 101. In addition, the wiring layer arranged between the wiring layer 202_*n* of the wiring layers 202 and the principal surface 151 of the substrate 200 is provided with an opening portion (a region provided with no wiring pattern) having the same area as that of the opening portion 106 in a region overlapping the opening portion 106.

As described above, in the annealing process in manufacturing the liquid discharge head substrate 100 like that shown in FIG. 9, hydrogen is supplied from the insulating film 201 to the temperature detection element 103. In the arrangement shown in FIGS. 3 and 4, there may be differences in resistance value change between the temperature detection elements 103_2 to 103_*n* provided with the opening portions 101 in both sides and the temperature detection elements 103_1 and 103_*n* arranged between the opening portion 101 and the opening portion 106. However, the differences in resistance value between the temperature detection elements 103_2 to 103_*n*–1 and the temperature detection elements 103_1 and 103_*n* are smaller than that in the case where no opening portions 106 are provided. On the other hand, reducing the opening portions 106 can reduce the restriction on the placements of elements such as driving circuits arranged in the non-liquid discharge regions 105.

Figure 5:
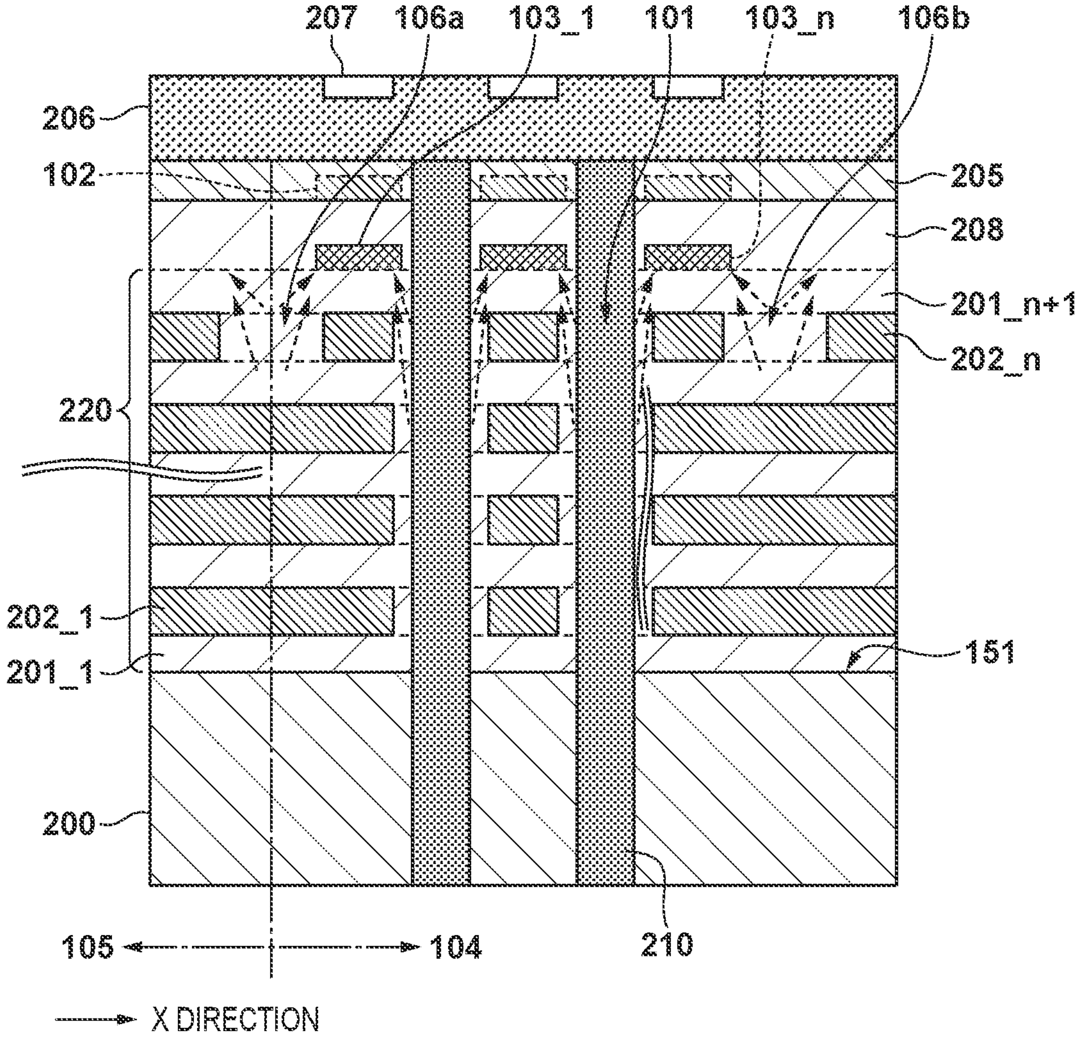
FIG. 5 is a sectional view showing an example of the arrangement of the liquid discharge head substrate in FIG. 1.

FIG. 5 is a sectional view showing a modification of the liquid discharge head substrate 100 described above. FIG. 5 shows a modification of the arrangement shown in FIG. 2. As shown in FIG. 4, however, the area of the opening portion 106 may be smaller than that of the opening portion 101.

In the arrangement shown in FIGS. 2 and 4 described above, in an orthogonal projection with respect to the principal surface 151 of the substrate 200, the wiring layer 202 arranged between the wiring layer 202_*n* of the plurality of wiring layers 202 and the principal surface 151 of the substrate 200 is not provided with any wiring pattern in a region overlapping the opening portion 106. In contrast to this, in the arrangement shown in FIG. 5, in an orthogonal projection with respect to the principal surface 151 of the substrate 200, the wiring layer 202 arranged between the wiring layer 202_*n* of the plurality of wiring layers 202 and the principal surface 151 of the substrate 200 includes a wiring layer provided with a wiring pattern in a region overlapping the opening portion 106. Other arrangements may be the same as those shown in FIG. 2.

One or more wiring layers 202 provided with wiring patterns may be arranged in regions overlapping the opening portions 106. As shown in FIG. 5, the wiring layers 202 other than the wiring layer 202_*n* may be provided with wiring patterns in regions overlapping the opening portions 106. That is, the wiring layers 202 other than the wiring layer 202_*n* nearest to the temperature detection element 103 may be or may not be provided with wiring patterns in regions overlapping the opening portions 106.

As described above, in the annealing process in manufacturing the liquid discharge head substrate 100 like that shown in FIG. 9, hydrogen is supplied from the insulating film 201 to the temperature detection elements 103. In the arrangement shown in FIG. 5, there may be differences in resistance value change between the temperature detection elements 103_2 to 103_*n*–1 provided with the opening portions 101 in both sides and the temperature detection elements 103_1 and **103_*n* arranged between the opening portion 101 and the opening portion 106. However, the differences in resistance value between the temperature detection elements 103_2 to 103_*n*−1 and the temperature detection elements 103_1 and 103_*n* are smaller than that in the case where no opening portions 106 are provided. On the other hand, the arrangement shown in FIG. 5 reduces the restrictions on the placement of wiring patterns in the wiring layers 202 other than the wiring layer 202_*n* in the non-liquid discharge regions 105. This can further reduce the restriction on the placement of elements such as driving circuits arranged in the non-liquid discharge region 105 as compared with the arrangement shown in FIGS. 3 and 4**.

Figure 6:
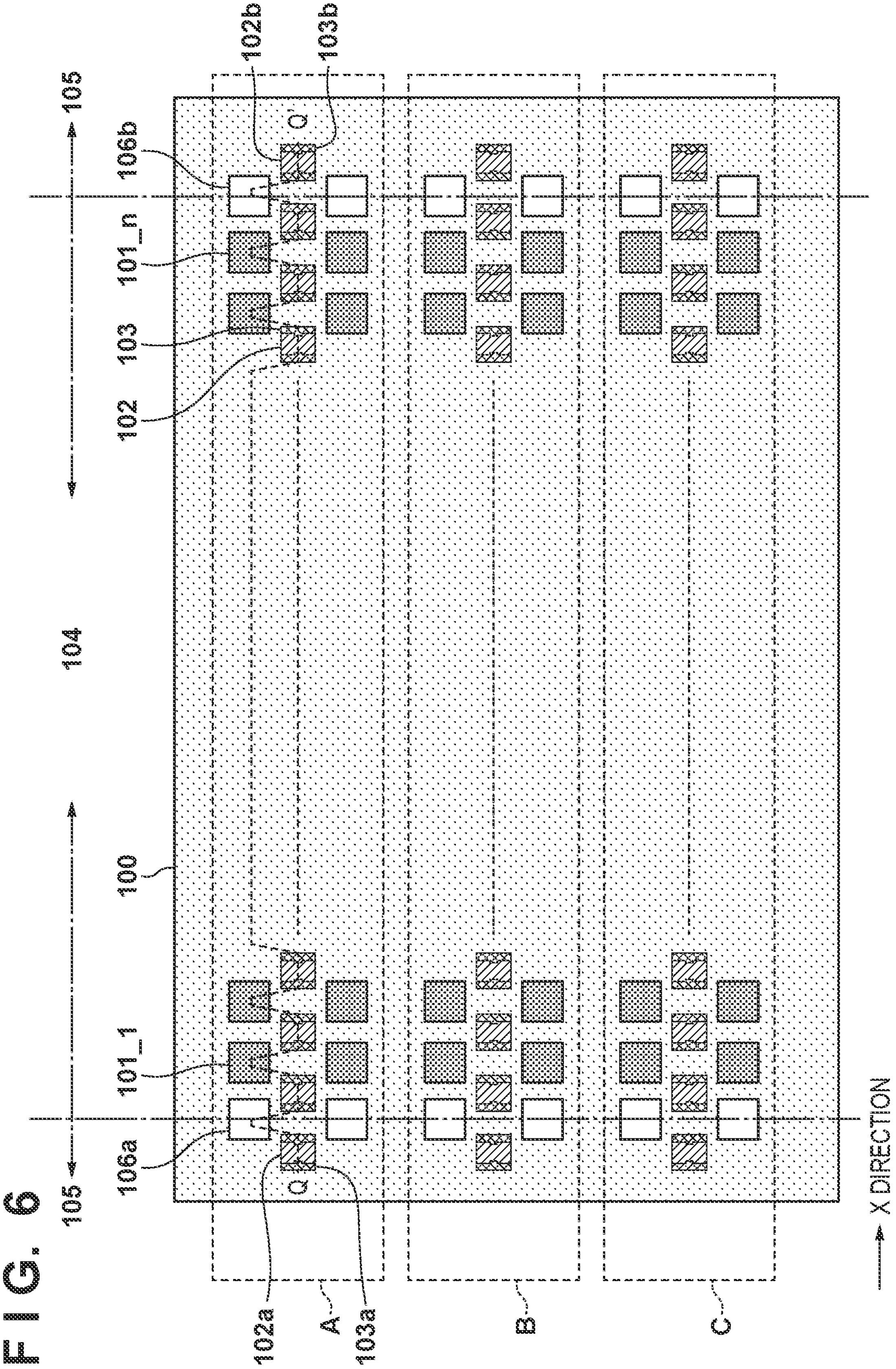
FIG. 6 is a plan view showing a modification of the liquid discharge head substrate in FIG. 1.
Figure 7:
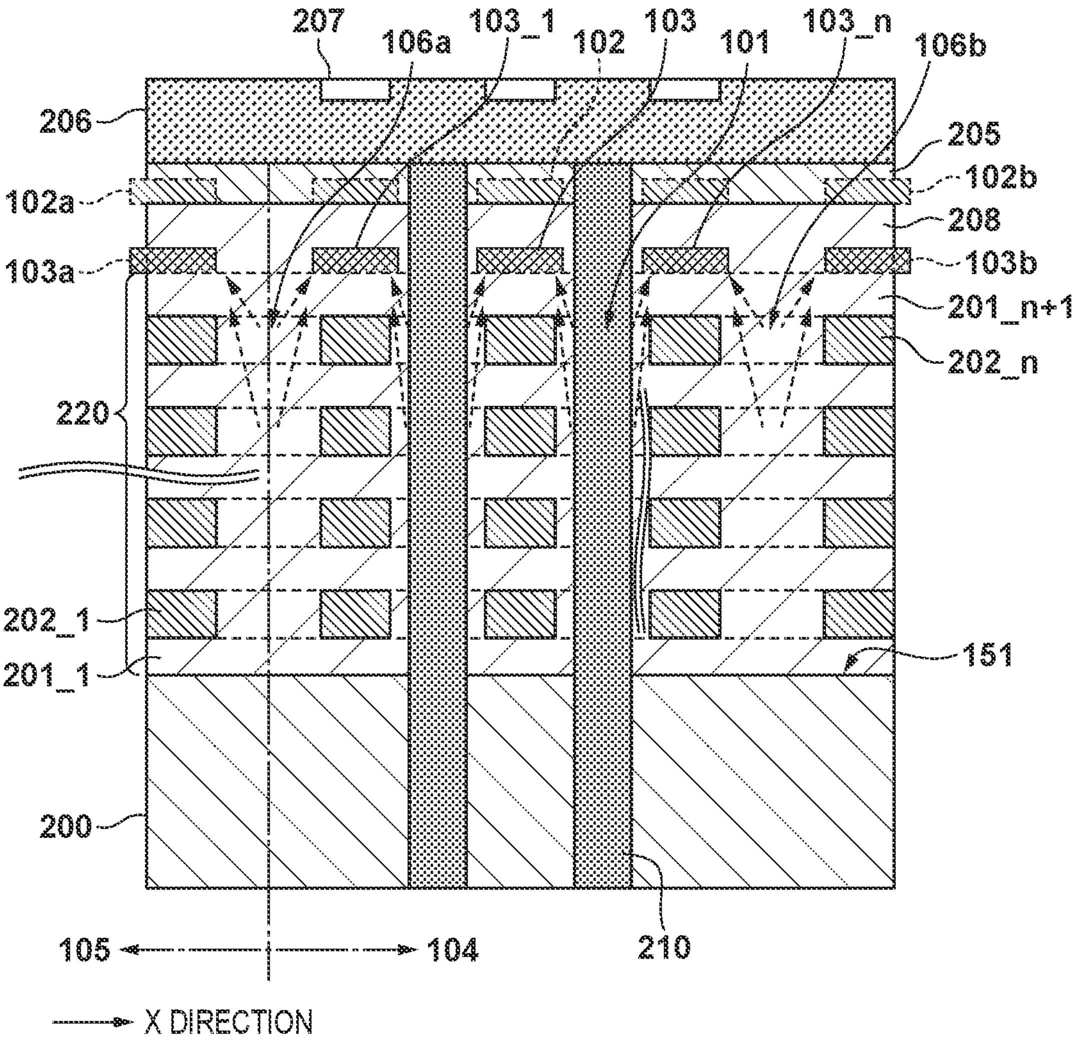
FIG. 7 is a sectional view showing an example of the arrangement of the liquid discharge head substrate in FIG. 6.

FIGS. 6 and 7 show a modification of the liquid discharge head substrate 100 shown in FIGS. 1 and 2. In each arrangement described above, the plurality of temperature detection elements 103 are not arranged outside the two ends of each of the arrays of the plurality of opening portions 101 and 106 in the X direction. Likewise, the plurality of electrothermal converting elements 102 are not arranged outside the two ends of each of the arrays of the plurality of opening portions 101 and 106 in the X direction. In contrast, in the arrangement shown in FIGS. 6 and 7, the plurality of temperature detection elements 103 include temperature detection elements **103*a* and 103*b* arranged outside the two ends of each of the arrays of the plurality of opening portions 101 and 106 in the X direction. Likewise, the plurality of electrothermal converting elements 102 include electrothermal converting elements 102*a* and 102*b* arranged outside the two ends of each of the arrays of the plurality of opening portions 101 and 106 in the X direction. Other arrangements may be the same as those shown in FIGS. 1 and 2. In addition, the electrothermal converting elements 102*a* and 102*b* and the temperature detection elements 103*a* and 103*b* may be added to the arrangement shown in FIGS. 3 to 5**.

As shown in FIG. 7, the discharge ports 207 are not arranged above the electrothermal converting elements **102*a* and 102*b*. That is, the electrothermal converting elements 102*a* and 102*b* are dummy electrothermal converting elements. A dummy electrothermal converting element can be, for example, an element to which no wiring pattern is connected and which generates no heat. In addition, a dummy electrothermal converting element can be, for example, an element to which no power is supplied and which generates no heat even if a wiring pattern is connected to the element. Furthermore, a dummy electrothermal converting element may be an element to which a wiring pattern is connected and power is supplied to generate heat if the discharge port 207 is not provided. Likewise, the discharge ports 207 are not also arranged above the temperature detection elements 103*a* and 103*b*. That is, the temperature detection elements 103*a* and 103*b* may be dummy temperature detection elements. A dummy temperature detection element can be, for example, an element to which no wiring pattern is connected. In addition, a dummy temperature detection element can be, for example, an element which is not used for the detection of a temperature even if a wiring pattern is connected to the element. Furthermore, a dummy temperature detection element may be an element which is used for the detection of a temperature if the discharge port 207** is not provided.

As described above, in the annealing process in manufacturing the liquid discharge head substrate 100 like that shown in FIG. 9, hydrogen is supplied from the insulating film 201 to the temperature detection elements 103. In the arrangement shown in FIGS. 6 and 7, the structure around the temperature detection elements 103_1 and **103_*n* arranged on the two ends of the liquid discharge region 104 is approximate to the temperature detection elements 103_2 to 103_*n*−1 arranged inside the liquid discharge region 104. Accordingly, the amounts of hydrogen supplied from the insulating film 201 to the respective temperature detection elements 103_1 to 103_*n*** can be equal to each other more than in each arrangement described above.

According to the arrangement shown in FIGS. 6 and 7, a sectional structure of the liquid discharge region 104 is made constant owing to the electrothermal converting elements **102*a* and 102*b* and the temperature detection elements 103*a* and 103*b*. This makes it possible to suppress film thickness variations of the insulating films 201, the wiring layers 202, the temperature detection elements 103, the electrothermal converting elements 102, and the like arranged in the liquid discharge region 104 in the process of manufacturing the liquid discharge head substrate 100. Accordingly, the characteristic variations of the electrothermal converting elements 102 and the temperature detection elements 103 can be suppressed more than in each arrangement described above. That is, changes in resistance value of the respective temperature detection elements 103 are easily made uniform, and hence it is possible to more accurately measure temperatures in the liquid discharge head substrate 100**.

Figure 8:
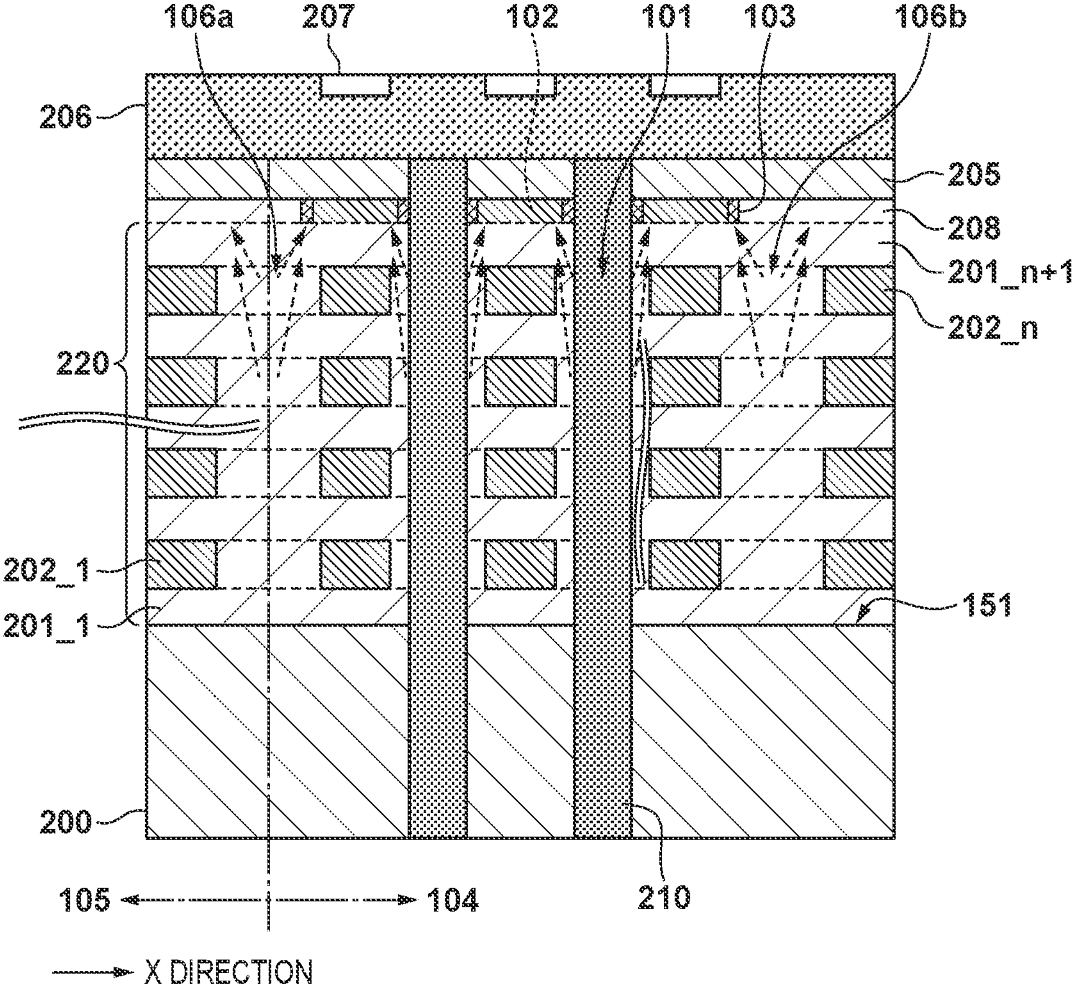
FIG. 8 is a sectional view showing an example of the arrangement of the liquid discharge head substrate in FIG. 1.

FIG. 8 is a sectional view showing a modification of the liquid discharge head substrate 100 described above. FIG. 8 shows a modification of the arrangement shown in FIG. 2. The arrangements shown in FIGS. 3 to 7 each may be combined with this modification.

In each arrangement described above, the plurality of temperature detection elements 103 are arranged between the plurality of electrothermal converting elements 102 and the structure 220. In an orthogonal projection with respect to the principal surface 151 of the substrate 200, at least part of each of the plurality of temperature detection elements 103 is arranged to overlap a corresponding one of the electrothermal converting elements 102. However, this is not exhaustive. As shown in FIG. 8, the plurality of electrothermal converting elements 102 and the plurality of temperature detection elements 103 may be arranged on the same layer. In this case, the plurality of temperature detection elements 103 may be arranged so as to be respectively adjacent to the corresponding ones of the plurality of electrothermal converting elements 102.

In the arrangement shown in FIG. 8 as well, as in each arrangement described above, it is possible to suppress variations in characteristics such as the resistance values of the temperature detection elements 103. In addition, in the arrangement shown in FIG. 8, the electrothermal converting element 102 and the temperature detection element 103 are arranged on the same layer, and hence the number of layers stacked can be reduced as compared with the arrangements shown in FIGS. 1 to 7. This makes it possible to reduce the number of steps of manufacturing the liquid discharge head substrate 100 and achieve a reduction in cost.

Other Embodiments

Figure 10A:
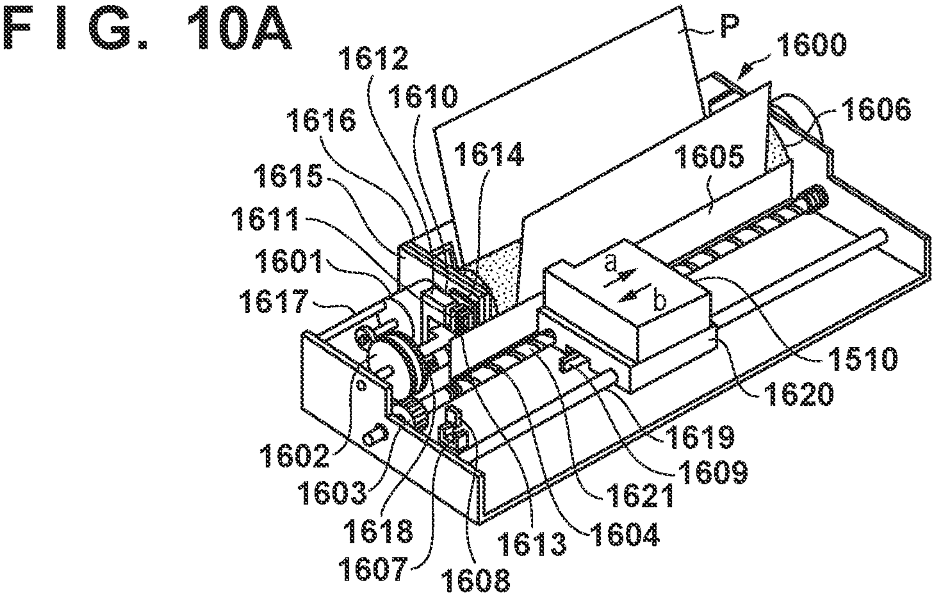
FIGS. 10A to 10D are views showing an example of the arrangement of a liquid discharge apparatus using the liquid discharge head substrate in FIG. 1.

A liquid discharge apparatus using the above-described liquid discharge head substrate 100 will be explained with reference to FIGS. 10A to 10D. FIG. 10A exemplifies the internal arrangement of a liquid discharge apparatus 1600 typified by an inkjet printer, a facsimile apparatus, or a copying machine. In this example, the liquid discharge apparatus may also be called a printing apparatus. The liquid discharge apparatus 1600 includes a liquid discharge head 1510 that discharges a liquid (in this example, ink or a printing material) to a predetermined medium P (in this example, a printing medium such as paper). In this example, the liquid discharge head may also be called a printhead. The liquid discharge head 1510 is mounted on a carriage 1620, and the carriage 1620 can be attached to a lead screw 1621 having a helical groove 1604. The lead screw 1621 can rotate in synchronization with rotation of a driving motor 1601 via driving force transmission gears 1602 and 1603. The liquid discharge head 1510 can move in a direction indicated by an arrow a or b along a guide 1619 together with the carriage 1620.

The medium P is pressed by a paper press plate 1605 in the carriage moving direction and fixed to a platen 1606. The liquid discharge apparatus 1600 performs liquid discharge (in this example, printing) to the medium P conveyed on the platen 1606 by a conveyance unit (not shown) by reciprocating the liquid discharge head 1510.

The liquid discharge apparatus 1600 confirms the position of a lever 1609 provided on the carriage 1620 via photocouplers 1607 and 1608, and switches the rotational direction of the driving motor 1601. A support member 1610 supports a cap member 1611 for covering the nozzle (liquid orifice or simply orifice) of the liquid discharge head 1510. A suction portion 1612 performs recovery processing of the liquid discharge head 1510 by sucking the interior of the cap member 1611 via an intra-cap opening 1613. A lever 1617 is provided to start recovery processing by suction, and moves along with movement of a cam 1618 engaged with the carriage 1620. A driving force from the driving motor 1601 is controlled by a well-known transmission mechanism such as a clutch switch.

A main body support plate 1616 supports a moving member 1615 and a cleaning blade 1614. The moving member 1615 moves the cleaning blade 1614 to perform recovery processing of the liquid discharge head 1510 by wiping. The liquid discharge apparatus 1600 includes a controller (not shown) and the controller controls driving of each mechanism described above.

Figure 10B:
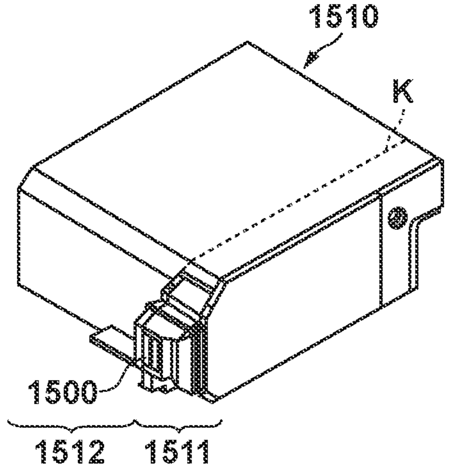

FIG. 10B exemplifies the outer appearance of the liquid discharge head 1510. The liquid discharge head 1510 can include a head portion 1511 having a plurality of nozzles 1500, and a tank (liquid storage portion) 1512 that holds a liquid to be supplied to the head portion 1511. The tank 1512 and the head portion 1511 can be separated at, for example, a broken line K and the tank 1512 is interchangeable. The liquid discharge head 1510 has an electrical contact (not shown) for receiving an electrical signal from the carriage 1620 and discharges a liquid in accordance with the electrical signal. The tank 1512 has a fibrous or porous liquid holding member (not shown) and the liquid holding member can hold a liquid.

Figure 10C:
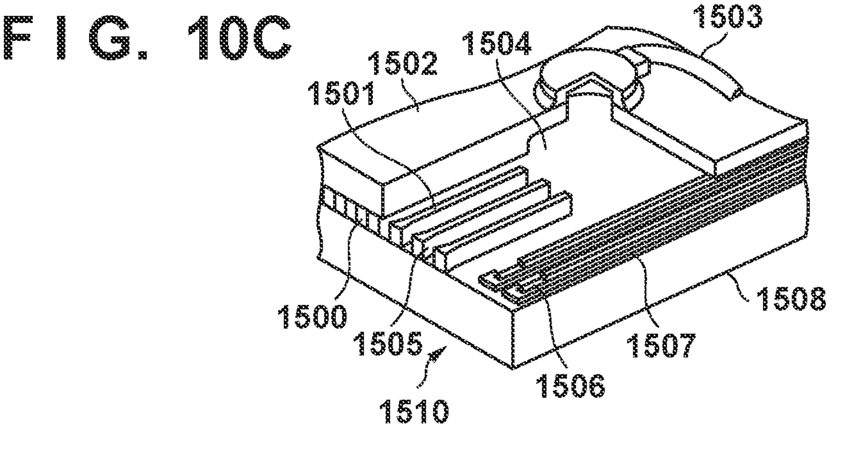

FIG. 10C exemplifies the internal arrangement of the liquid discharge head 1510. The liquid discharge head 1510 includes a base 1508, flow path wall members 1501 that are arranged on the base 1508 and form flow paths 1505, and a top plate 1502 having a liquid supply path 1503. The base 1508 may be the above-described liquid discharge head substrate 100. As discharge elements or liquid discharge elements (corresponding to the electrothermal converting element 102 described above, for example), heaters 1506 (which can also be referred to as electrothermal transducers or heat generating resistive elements) are arrayed on the substrate (liquid discharge head substrate) of the liquid discharge head 1510 in correspondence with the respective nozzles 1500. Each heater 1506 is driven to generate heat by turning on a driving element (switching element such as a transistor) provided in correspondence with the heater 1506.

A liquid from the liquid supply path 1503 is stored in a common liquid chamber 1504 and supplied to each nozzle 1500 via the corresponding flow path 1505. The liquid supplied to each nozzle 1500 is discharged from the nozzle 1500 in response to driving of the heater 1506 corresponding to the nozzle 1500.

Figure 10D:
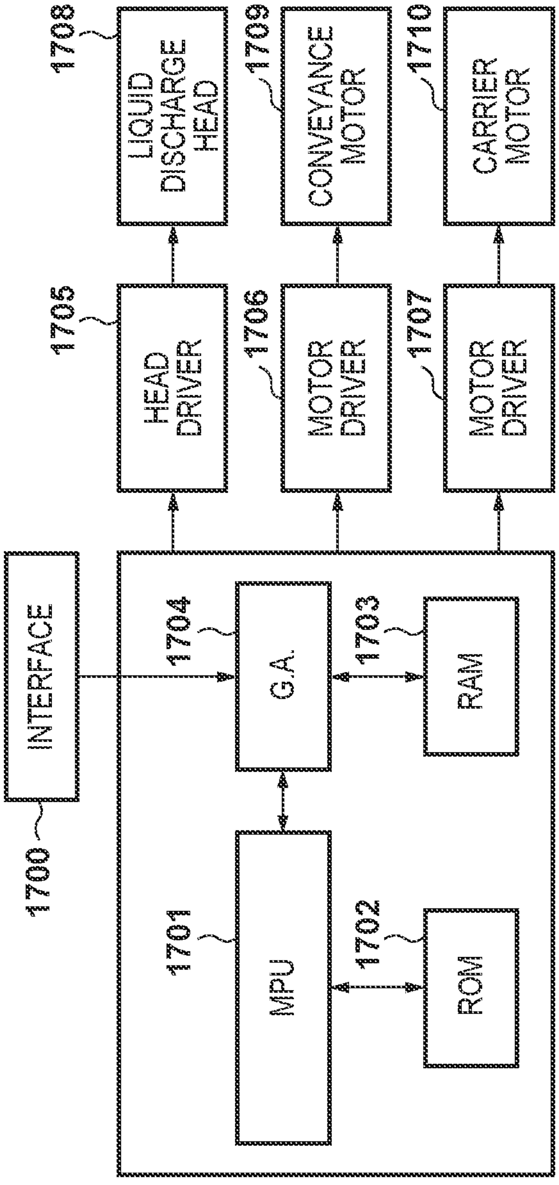

FIG. 10D exemplifies the system arrangement of the liquid discharge apparatus 1600. The liquid discharge apparatus 1600 includes an interface 1700, a MPU 1701, a ROM 1702, a RAM 1703, and a gate array (G.A.) 1704. The interface 1700 receives from the outside an external signal for executing liquid discharge. The ROM 1702 stores a control program to be executed by the MPU 1701. The RAM 1703 saves various signals and data such as the above-mentioned external signal for liquid discharge and data supplied to the liquid discharge head 1708. The gate array 1704 performs supply control of data to the liquid discharge head 1708 and control of data transfer between the interface 1700, the MPU 1701, and the RAM 1703.

The liquid discharge apparatus 1600 further includes a head driver 1705, motor drivers 1706 and 1707, a conveyance motor 1709, and a carrier motor 1710. The carrier motor 1710 conveys a liquid discharge head 1708. The conveyance motor 1709 conveys the medium P. The head driver 1705 drives the liquid discharge head 1708. The motor drivers 1706 and 1707 drive the conveyance motor 1709 and the carrier motor 1710, respectively.

When a driving signal is input to the interface 1700, it can be converted into data for liquid discharge between the gate array 1704 and the MPU 1701. Each mechanism performs a desired operation in accordance with this data. In this manner, the liquid discharge head 1708 is driven.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-042316, filed Mar. 16, 2023, which is hereby incorporated by reference herein in its entirety.

What is claimed is:

1. A liquid discharge head substrate comprising a substrate, a plurality of electrothermal converting elements arranged on a principal surface of the substrate along a first direction to discharge a liquid, a plurality of temperature detection elements arranged along the first direction to detect temperatures of the plurality of electrothermal converting elements, a plurality of liquid supply ports arranged along the first direction to supply the liquid, and a structure including at least one wiring layer in an insulating film arranged between the principal surface and the plurality of temperature detection elements, wherein a wiring pattern arranged in a first wiring layer, of the wiring layers, which is nearest to the plurality of temperature detection elements is provided with a plurality of opening portions arranged along the first direction so as to be adjacent to the plurality of temperature detection elements in an orthogonal projection with respect to the principal surface, the plurality of opening portions include a plurality of first opening portions and a plurality of second opening portions, each of the plurality of liquid supply ports passes through a corresponding one of the plurality of first opening portions, and the plurality of second opening portions are embedded with part of the insulating film and are arranged at least two ends of an array of the plurality of opening portions.

2. The substrate according to claim 1, wherein the plurality of liquid supply ports do not pass through the plurality of second opening portions.

3. The substrate according to claim 1, wherein the structure is provided with a plurality of wiring layers.

4. The substrate according to claim 3, wherein in an orthogonal projection with respect to the principal surface, a wiring layer, of the plurality of wiring layers, arranged between the principal surface and the first wiring layer is not provided with a wiring pattern in a region overlapping the plurality of second opening portions.

5. The substrate according to claim 3, wherein in an orthogonal projection with respect to the principal surface, a wiring layer, of the plurality of wiring layers, arranged between the principal surface and the first wiring layer includes a wiring layer provided with a wiring pattern in a region overlapping the plurality of second opening portions.

6. The substrate according to claim 3, wherein in an orthogonal projection with respect to the principal surface, a wiring layer, of the plurality of wiring layers, arranged between the principal surface and the first wiring layer is not provided with a wiring pattern in a region overlapping the plurality of first opening portions.

7. The substrate according to claim 1, wherein the plurality of temperature detection elements are arranged between the plurality of electrothermal converting elements and the structure, and in an orthogonal projection with respect to the principal surface, at least part of each of the plurality of temperature detection elements is arranged to overlap a corresponding one of the plurality of electrothermal converting elements.

8. The substrate according to claim 1, wherein the plurality of electrothermal converting elements and the plurality of temperature detection elements are arranged on the same layer, and each of the plurality of temperature detection elements is arranged to be adjacent to a corresponding one of the plurality of electrothermal converting elements.

9. The substrate according to claim 1, wherein in an orthogonal projection with respect to the principal surface, the plurality of first opening portions each have the same area as an area of each of the plurality of second opening portions.

10. The substrate according to claim 1, wherein in an orthogonal projection with respect to the principal surface, the plurality of first opening portions each have an area different from an area of each of the plurality of second opening portions.

11. The substrate according to claim 10, wherein the plurality of first opening portion each have an area larger than an area of each of the plurality of second opening portions.

12. The substrate according to claim 1, wherein the plurality of temperature detection elements include temperature detection elements arranged outside two ends of an array of the plurality of opening portions in the first direction.

13. The substrate according to claim 1, wherein the plurality of electrothermal converting elements include electrothermal converting elements arranged outside two ends of an array of the plurality of opening portions in the first direction.

14. The substrate according to claim 1, wherein the plurality of temperature detection elements are not arranged outside two ends of an array of the plurality of opening portions in the first direction.

15. The substrate according to claim 1, wherein the plurality of electrothermal converting elements are not arranged outside two ends of an array of the plurality of opening portions in the first direction.

16. The substrate according to claim 1, wherein the plurality of temperature detection elements contain at least one of titanium, tantalum, palladium, and magnesium.

17. A liquid discharge head comprising:

the liquid discharge head substrate according to claim 1; and a discharge port from which discharge of a liquid is controlled by the liquid discharge head substrate.

18. A liquid discharge apparatus comprising:

the liquid discharge head according to claim 17; and a unit configured to supply a driving signal for making the liquid discharge head discharge a liquid.

* * * * *